(12) United States Patent
Horiuchi et al.

(10) Patent No.: US 11,265,727 B2
(45) Date of Patent: Mar. 1, 2022

(54) BASE STATION AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Proper ty Corporation of America, Torrance, CA (US)

( * ) Notice: Subject to any disclaimer, the term of this patent is extended or adjusted under 35 U.S.C. 154(b) by 0 days.

(21) Appl. No.: 16/489,697

(22) PCT Filed: Jan. 19, 2018

(86) PCT No.: PCT/JP2018/001515
§ 371 (c)(1),
(2) Date: Aug. 28, 2019

(87) PCT Pub. No.: WO2018/173442
PCT Pub. Date: Sep. 27, 2018

(65) Prior Publication Data
US 2020/0008071 A1    Jan. 2, 2020

(30) Foreign Application Priority Data

Mar. 22, 2017 (JP) .............................. JP2017-056577

(51) Int. Cl.
*H04W 16/14* (2009.01)
*H04L 5/00* (2006.01)
*H04W 72/04* (2009.01)

(52) U.S. Cl.
CPC ........... *H04W 16/14* (2013.01); *H04L 5/0007* (2013.01); *H04W 72/0446* (2013.01)

(58) Field of Classification Search
CPC ....... H04L 1/0079; H04L 5/00; H04L 5/0007; H04L 5/0053; H04L 27/26;
(Continued)

(56) References Cited

U.S. PATENT DOCUMENTS 8,401,542 B2 * 3/2013 Chung ................. H04L 5/0053
455/423
8,755,345 B2 * 6/2014 Xie ....................... H04L 5/0053
370/329

(Continued)

OTHER PUBLICATIONS

International Search Report of PCT application No. PCT/JP2018/001515 dated Apr. 17, 2018.
(Continued)

*Primary Examiner* — Tri H Phan
(74) *Attorney, Agent, or Firm* — Seed IP Law Group LLP

(57) ABSTRACT

A base station includes: an allocating circuit that allocates, to a resource set which is monitored by a terminal belonging to a group, a first control signal which contains information indicating the configuration of a slot and a second control signal which does not contain the information indicating the configuration of a slot; and a transmitter that transmits the first control signal and the second control signal to a terminal. The number of symbols to which the first control signal is allocated is made equal to the smallest number of symbols to which the second control signal is allocated.

16 Claims, 14 Drawing Sheets

(58) Field of Classification Search
CPC .......... H04L 27/2601; H04L 27/2602; H04W 16/14; H04W 48/12; H04W 74/002; H04W 74/006; H04W 88/02; H04W 88/08; H04W 72/04; H04W 72/042; H04W 72/044; H04W 72/0406; H04W 72/0446; H04W 72/1273; H04W 72/1278; H04W 72/1289
See application file for complete search history.

(56) References Cited

U.S. PATENT DOCUMENTS

| | | | | |
|---|---|---|---|---|
| 9,872,123 | B2* | 1/2018 | Webb | H04W 4/06 |
| 10,700,837 | B2* | 6/2020 | Abdoli | H04L 5/0053 |
| 2020/0008180 | A1* | 1/2020 | Jo | H04L 5/0053 |
| 2020/0008232 | A1* | 1/2020 | Takeda | H04W 72/0446 |
| 2020/0136882 | A1* | 4/2020 | Jo | H04L 27/2666 |
| 2020/0229152 | A1* | 7/2020 | Park | H04W 72/042 |
| 2020/0236732 | A1* | 7/2020 | Liu | H04L 27/26 |
| 2020/0288482 | A1* | 9/2020 | Yl | H04W 72/121 |

OTHER PUBLICATIONS

3GPP TSG RAN Meeting #73, RP-161596, "Revision of SI : Study on New Radio Access Technology", Sep. 2016.

3GPP TSG RAN WG1 Meeting #88, R1-1702764, "Discussion on group common PDCCH", Feb. 2017.

Intel Corporation, "Group Common PDCCH," R1-1702219, Agenda Item: 8.1.3.1.2, 3GPP TSG RAN WG1 Meeting #88, Athens, Greece, Feb. 13-17, 2017, 4 pages.

English Translation of Chinese Search Report dated Mar. 1, 2021 for the related Chinese Patent Application No. 201880015599.2, 2 pages.

* cited by examiner

|  | Other PDCCH in Group common control resource set | Group common PDCCH |
|---|---|---|
| Minimum aggregation level | Aggregation level 4<br>One symbol | Aggregation level 1<br>One symbol |
| second aggregation level | Aggregation level 8<br>Two symbol | Aggregation level 2<br>Two symbol |

BASE STATION AND COMMUNICATION METHOD

TECHNICAL FIELD

The present disclosure relates to base stations and communication methods.

BACKGROUND ART

A communication system called a fifth-generation mobile communication system (5G) has been studied. In 5G, flexible provision of a function to each of the use cases in which an increase in communication traffic, an increase in the number of terminals to be connected, high reliability, and low latency are respectively required has been studied. As representative use cases, there are three use cases: enhanced mobile broadband (eMBB), massive machine type communications (mMTC), and ultra reliable and low latency communicantions (URLLC). 3GPP (3rd Generation Partnership Project), which is the international standard-setting organization, has studied sophistication of a communication system from the aspects of both sophistication of the LTE system and New RAT (radio access technology) (see, for example, NPL 1).

CITATION LIST

Non Patent Literature

NPL 1: RP-161596, "Revision of SI: Study on New Radio Access Technology", NTT DOCOMO, September 2016

SUMMARY OF INVENTION

In New RAT, as a control signal for notifying a terminal of the configuration of a slot, a group common PDCCH (physical downlink control channel) has been studied, and there is a need to study the specific placement of this control signal in radio resources.

An aspect of the present disclosure facilitates providing a base station and a communication method which appropriately place a common control signal, which notifies a terminal of the configuration of a slot, in radio resources.

A base station according to an aspect of the present disclosure includes: an allocating circuit that allocates, to a resource set which is monitored by a terminal belonging to a group, a first control signal which contains information indicating the configuration of a slot and a second control signal which does not contain the information; and a transmitter that transmits the first control signal and the second control signal to a terminal. The number of symbols to which the first control signal is allocated is made equal to the smallest number of symbols to which the second control signal is allocated.

A communication method according to an aspect of the present disclosure is a communication method including: allocating, to a resource set which is monitored by a terminal belonging to a group, a first control signal which contains information indicating the configuration of a slot and a second control signal which does not contain the information; and transmitting the first control signal and the second control signal to a terminal. The number of symbols to which the first control signal is allocated is made equal to the smallest number of symbols to which the second control signal is allocated.

It is to be noted that these comprehensive or specific aspects may be implemented by a system, a device, a method, an integrated circuit, a computer program, or a recording medium, or may be implemented by any combination of a system, a device, a method, an integrated circuit, a computer program, and a recording medium.

Advantageous Effects of Invention

According to an aspect of the present disclosure, it is possible to appropriately place a common control signal, which notifies a terminal of the configuration of a slot, in radio resources.

Additional advantages and effects in an aspect of the present disclosure will become apparent from the description and drawings. Although these advantages and/or effects are individually provided by features described in some embodiments and the description and drawings, all of them do not necessarily have to be provided to obtain one or more identical features.

DESCRIPTION OF EMBODIMENTS

Hereinafter, embodiments of the present disclosure will be described with reference to the drawings.

First Embodiment

Figure 1:
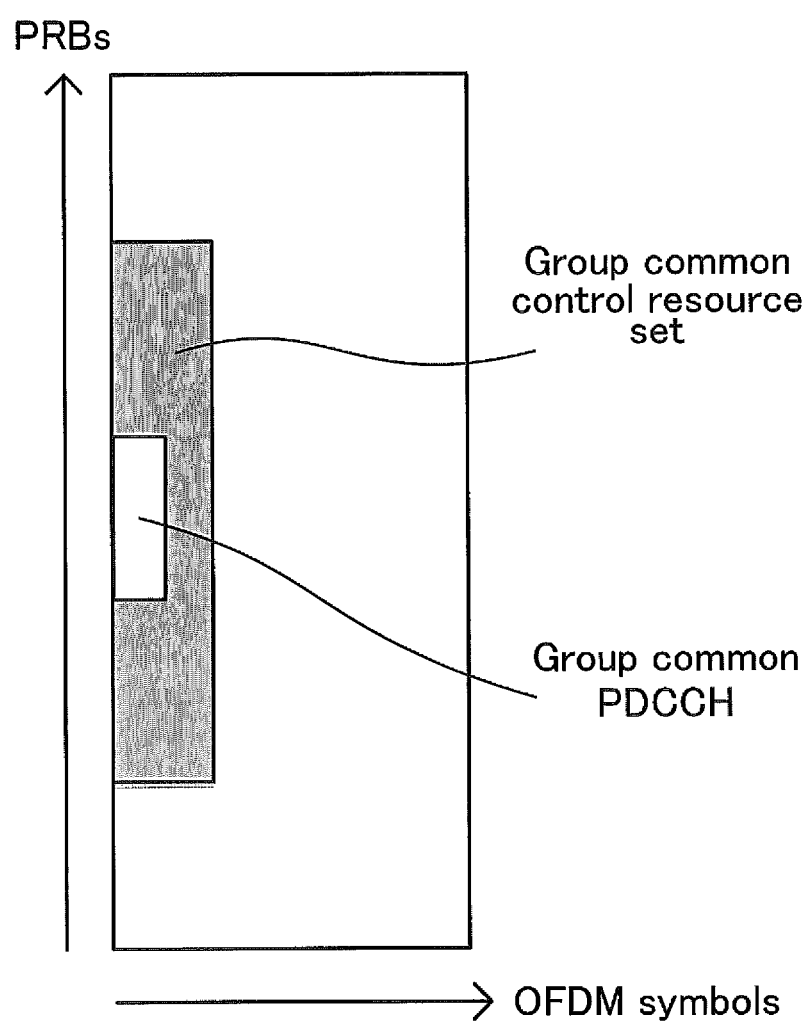
FIG. 1 explains a group common PDCCH according to a first embodiment.

FIG. 1 is a diagram explaining a group common PDCCH according to a first embodiment. In FIG. 1, a group common control resource set and a group common PDCCH are depicted. It is to be noted that the group common control resource set is sometimes called a CORSET (control resource set).

In NR (New Radio), as a control signal for notifying a terminal (UE: user equipment) of the configuration of a slot, a group common PDCCH has been studied. For example, the group common PDCCH is used to notify the terminal of the number of symbols of a DL (downlink), the number of symbols of a UL (uplink), the number of symbols which are used for other purposes, and so forth.

The group common PDCCH is used by terminals belonging to a group. For example, one group common PDCCH is used by terminals belonging to one group, and another group common PDCCH is used by terminals belonging to another group. As depicted in FIG. 1, placing the group common PDCCH in an area called a group common control resource set has been studied.

In addition to the group common PDCCH, placing other PDCCHs in the group common control resource set has been studied. For instance, in the group common control resource set, control signals which are used for a RACH (random access channel) response, power control, notification of paging, and allocation of SIBs (system information blocks) and the like are placed. These control signals are signals which are placed in a common search space in LTE. Hereinafter, a PDCCH (a PDCCH which does not contain information indicating the configuration of a slot), which is placed in the group common control resource set, other than the group common PDCCH is sometimes referred to as the other PDCCH.

Notifying the terminal of the frequency domain and the time domain of the group common control resource set by signaling of a higher-level layer has been studied. The terminal sets a search space in the group common control resource set.

As described above, it is assumed that the group common PDCCH is transmitted to a plurality of terminals in a group. Therefore, the group common PDCCH has to be transmitted in such a way that even a terminal of the poorest line quality in the group can receive the group common PDCCH.

Figure 2A:
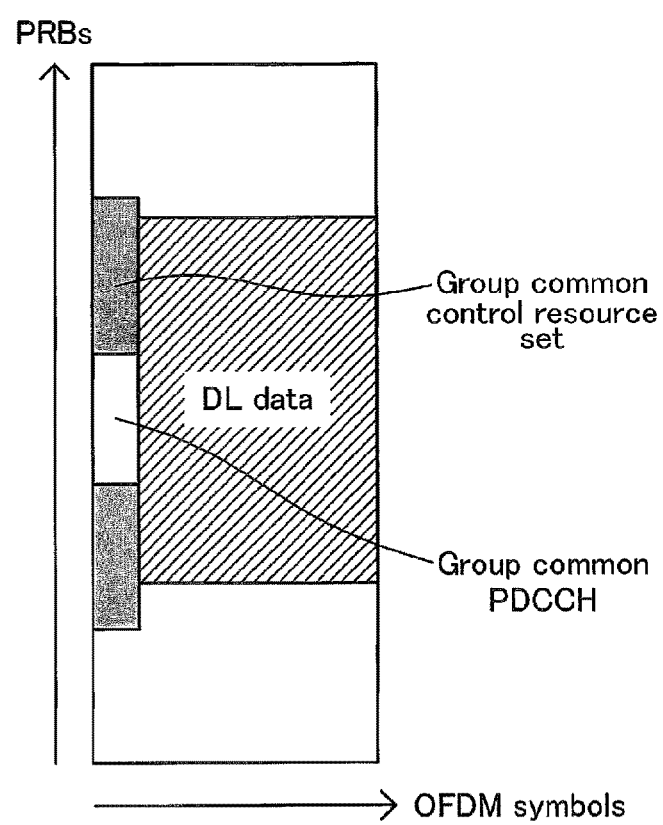
FIG. 2A explains the placement of the group common PDCCH.
Figure 2B:
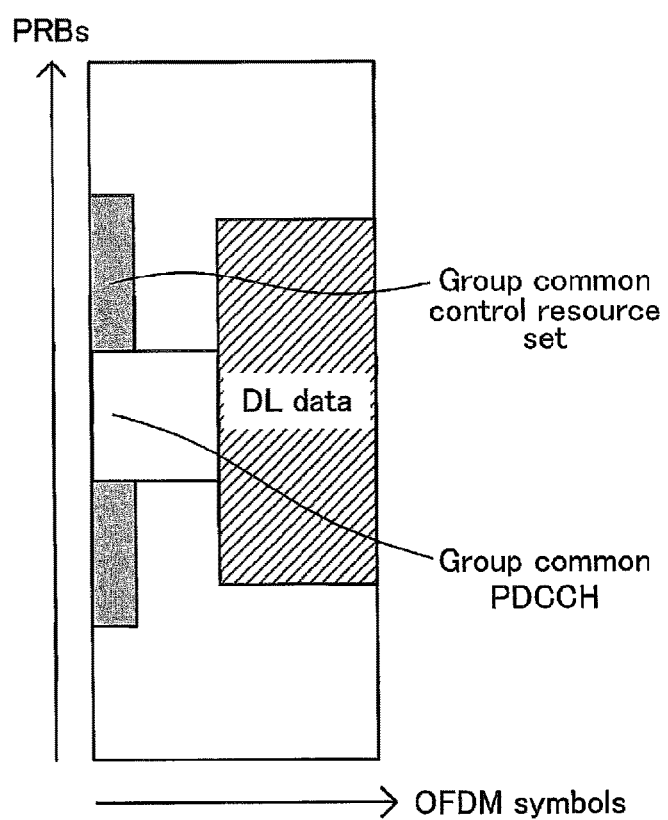
FIG. 2B explains the placement of the group common PDCCH.

FIGS. 2A and 2B are diagrams explaining the placement of the group common PDCCH. A possible method to improve the line quality is to place the group common PDCCH in a plurality of symbols. When there is a limit to transmission power which can be used for each symbol, by placing the group common PDCCH in a plurality of symbols, it is possible to improve the transmitting power of the group common PDCCH.

For example, in FIG. 2A, the group common PDCCH is allocated to one symbol; in FIG. 2B, the group common PDCCH is allocated to three symbols. As a result, in FIG. 2B, the total power of the group common PDCCH can be increased and the transmitting power can be improved.

However, placing the group common PDCCH in a plurality of symbols results in restrictions on the number of symbols that are used for, for example, a PDSCH (physical downlink shared channel) which transmits DL data, a PUSCH (physical uplink shared channel) (which is not depicted in FIGS. 2A and 2B) which transmits UL data, or a sidelink (which is not depicted in FIGS. 2A and 2B).

For instance, in the example of FIG. 2A, placement of DL data starts from the second symbol; in the example of FIG. 2B, placement of DL data starts from the fourth symbol. As a result, in the example of FIG. 2B, compared to the example of FIG. 2A, restrictions are put on the number of symbols which are used for DL data or the like.

A base station according to the present embodiment therefore designs the group common PDCCH in accordance with the design (the configuration that allocates (places) a signal such as a PDCCH to (in) a resource area such as a symbol) of the other PDCCH which is placed in the group common control resource set. For example, assume that the base station increases the number of symbols to which the other PDCCH is allocated in order to make the coverage of the other PDCCH wider. In this case, the base station also increases the number of symbols to which the group common PDCCH is allocated in accordance with the design of the other PDCCH. This makes it possible for the base station to appropriately place the group common PDCCH in radio resources.

Figure 3:
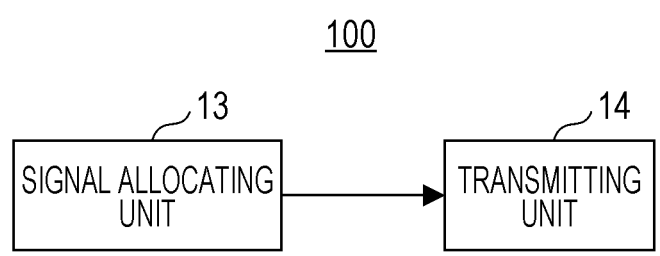
FIG. 3 depicts the configuration of part of a base station according to the first embodiment.

FIG. 3 is a block diagram depicting the configuration of part of a base station 100 according to the first embodiment. In the base station 100 depicted in FIG. 3, a signal allocating unit 13 allocates a group common PDCCH, which contains the information indicating the configuration of a slot, and the other PDCCH, which does not contain the information indicating the configuration of a slot, to a group common control resource set which is monitored by a terminal belonging to a group. A transmitting unit 14 transmits, to the terminal, the group common PDCCH and the other PDCCH which are allocated to the group common control resource set. When allocating the group common PDCCH and the other PDCCH to the group common control resource set, the base station 100 designs the group common PDCCH so as to make the number of symbols to which the group common PDCCH is allocated equal to the smallest number of symbols to which the other PDCCH is allocated.

Figure 4:
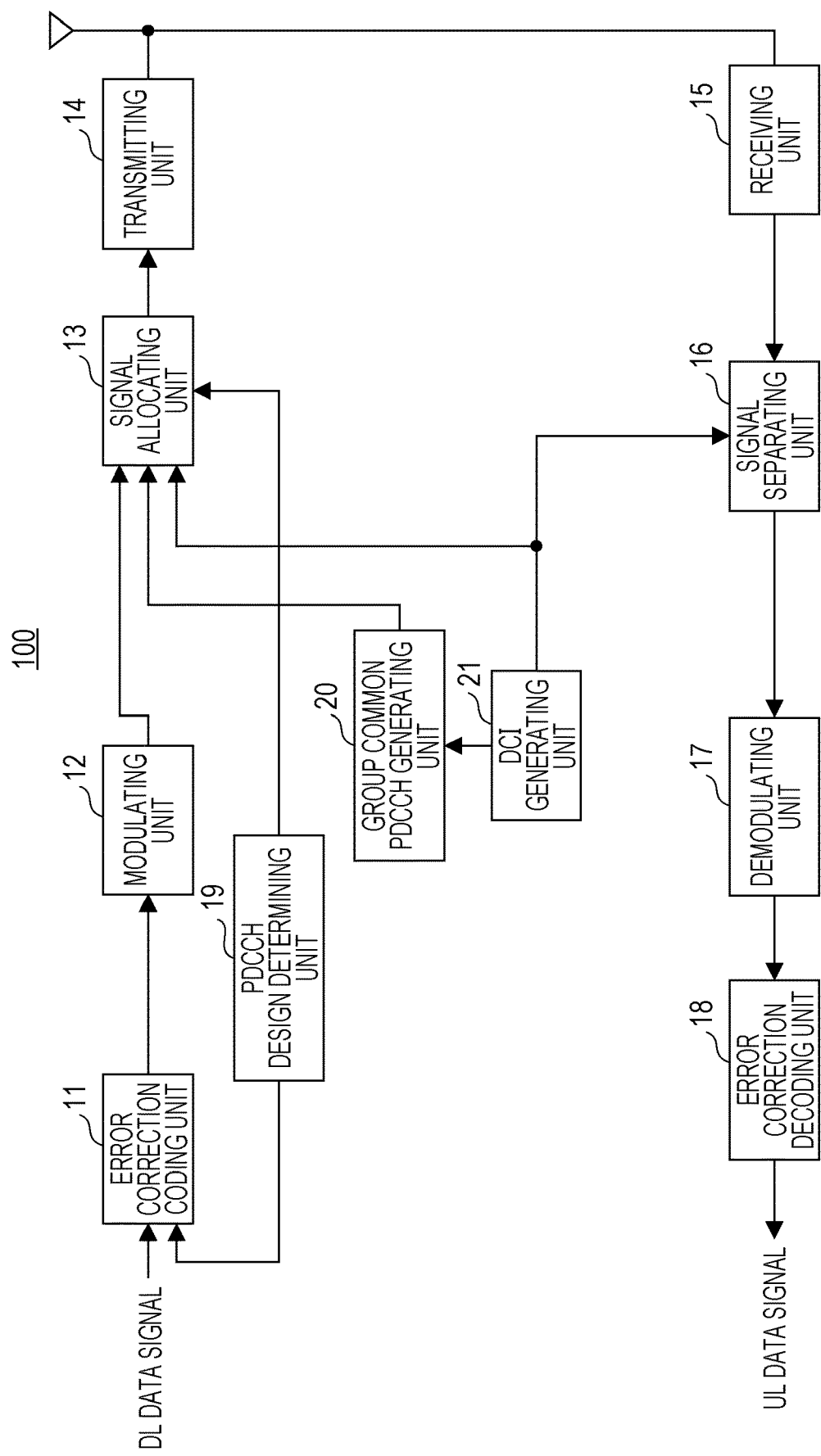
FIG. 4 depicts the configuration of the base station according to the first embodiment.

FIG. 4 is a block diagram depicting the configuration of the base station 100 according to the first embodiment. As depicted in FIG. 4, the base station 100 includes an error correction coding unit 11, a modulating unit 12, the signal allocating unit 13, the transmitting unit 14, a receiving unit 15, a signal separating unit 16, a demodulating unit 17, an error correction decoding unit 18, a PDCCH design determining unit 19, a group common PDCCH generating unit 20, and a DCI (downlink control information) generating unit 21.

To the error correction coding unit 11, a transmitted data signal (a DL data signal) and signaling (design information) of a higher-level layer, which is output from the PDCCH design determining unit 19, are input. The error correction coding unit 11 performs error correction coding processing on the input transmitted data signal and design information and outputs the signal to the modulating unit 12.

The modulating unit 12 performs modulation processing on the signal which is output from the error correction coding unit 11 and outputs the modulated signal to the signal allocating unit 13.

The signal allocating unit 13 allocates the DL data signal which is output from the modulating unit 12, DCI, which is a control signal, output from the DCI generating unit 21, and control information of a group common PDCCH, which is output from the group common PDCCH generating unit 20, to radio resources. The DCI is allocated to radio resources provided for a group common control resource set or a UE specific control resource set. Based on the design information which is output from the PDCCH design determining unit 19, the number of symbols to which the group common PDCCH is allocated is determined, and the group common PDCCH is allocated to radio resources in the group common control resource set. The generated signal is output to the transmitting unit 14.

The transmitting unit 14 performs radio transmission processing such as upconversion on the signal which is output from the signal allocating unit 13 and transmits the signal to the terminal via an antenna.

The receiving unit 15 receives a signal transmitted from the terminal via the antenna and outputs the signal to the signal separating unit 16.

The signal separating unit 16 separates the received signal based on UL allocation information which is output from the DCI generating unit 21. The UL data signal is output to the demodulating unit 17.

The demodulating unit 17 performs demodulation processing on the signal which is output from the signal separating unit 16 and outputs the signal subjected to the demodulation processing to the error correction decoding unit 18.

The error correction decoding unit 18 decodes the signal which is output from the demodulating unit 17 and obtains a received data signal from the terminal.

The PDCCH design determining unit 19 determines the design of a PDCCH. For example, the PDCCH design determining unit 19 determines a design that decides to which REG (resource element group) a CCE (control channel element) is mapped, a design that decides with which CCEs a PDCCH is configured when an aggregation level is 2 or higher, and the frequency domain and the time domain of the group common control resource set. The PDCCH design determining unit 19 outputs design information indicating the determined design to the error correction coding unit 11 as signaling of a higher-level layer. Moreover, the PDCCH design determining unit 19 outputs the determined design to the signal allocating unit 13.

The group common PDCCH generating unit 20 generates control information which is transmitted by the group common PDCCH. For example, the group common PDCCH generating unit 20 generates, from information which is output from the DCI generating unit 21, the DL data amount, and information on the UL data amount, information indicating the configuration (for instance, the number of symbols of a DL, the number of symbols of a UL, and the number of other symbols) of a slot, a minislot, or a subframe and outputs the information to the signal allocating unit 13.

The DCI generating unit 21 generates radio resource allocation information of DL data or UL data (DL allocation information or UL allocation information). The DCI generating unit 21 outputs the DL allocation information to the signal allocating unit 13 and outputs the UL allocation information to the signal separating unit 16. Moreover, the DCI generating unit 21 calculates the required number of symbols from the number of pieces of DCI which are transmitted in units of slots, minislots, or subframes, the aggregation level of each DCI, settings of a search space, and so forth and outputs the required number of symbols to the group common PDCCH generating unit 20.

Figure 5:
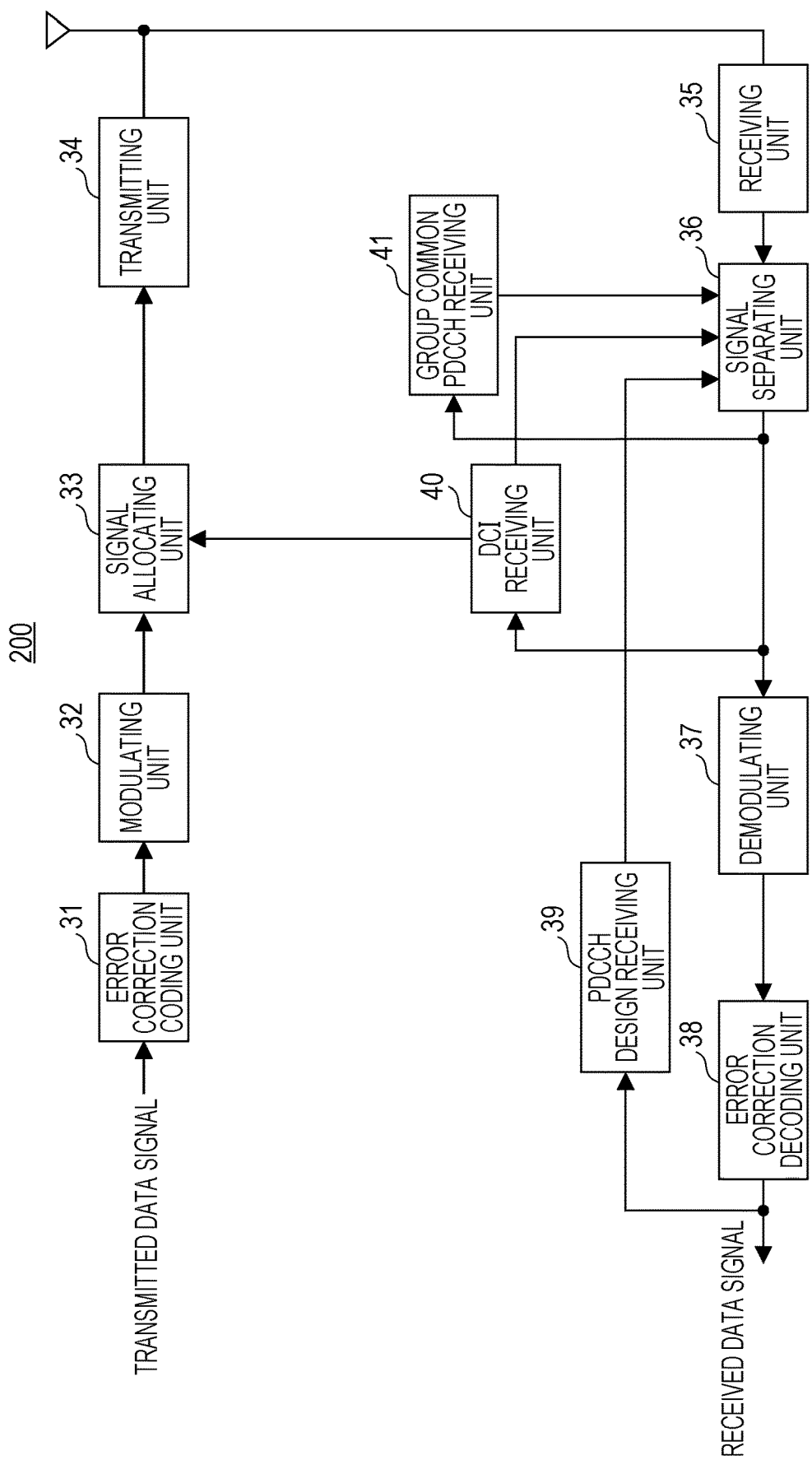
FIG. 5 depicts the configuration of a terminal according to the first embodiment.

FIG. 5 is a block diagram depicting the configuration of a terminal 200 according to the first embodiment. As depicted in FIG. 5, the terminal 200 includes an error correction coding unit 31, a modulating unit 32, a signal allocating unit 33, a transmitting unit 34, a receiving unit 35, a signal separating unit 36, a demodulating unit 37, an error correction decoding unit 38, a PDCCH design receiving unit 39, a DCI receiving unit 40, and a group common PDCCH receiving unit 41.

To the error correction coding unit 31, a transmitted data signal (a UL data signal) is input. The error correction coding unit 31 performs error correction coding processing on the input transmitted data signal and outputs the signal to the modulating unit 32.

The modulating unit 32 performs modulation processing on the signal which is output from the error correction coding unit 31 and outputs the modulated signal to the signal allocating unit 33.

The signal allocating unit 33 allocates the transmitted signal which is output from the modulating unit 32 to radio resources based on UL allocation information which is output from the DCI receiving unit 40 and outputs the signal to the transmitting unit 34.

The transmitting unit 34 performs transmission processing such as upconversion on the signal which is output from the signal allocating unit 33 and transmits the signal to the base station 100.

The receiving unit 35 receives a signal transmitted from the base station 100 via an antenna, performs reception processing such as downconversion thereon, and outputs the signal to the signal separating unit 36.

Based on design information which is output from the PDCCH design receiving unit 39, the signal separating unit 36 identifies the number of symbols to which a group common PDCCH is allocated and separates the group common PDCCH. The signal separating unit 36 outputs the separated group common PDCCH to the group common PDCCH receiving unit 41. Moreover, the signal separating unit 36 separates DCI based on the design information which is output from the PDCCH design receiving unit 39. The signal separating unit 36 outputs the separated DCI to the DCI receiving unit 40. Furthermore, based on allocation information of a DL which is output from the DCI receiving unit 40, the signal separating unit 36 separates DL data or signaling of a higher-level layer and outputs the DL data or signaling of a higher-level layer to the demodulating unit 37.

The demodulating unit 37 performs demodulation processing on the signal which is output from the signal separating unit 36 and outputs the signal to the error correction decoding unit 38.

The error correction decoding unit 38 decodes the demodulated signal which is output from the demodulating unit 37, outputs the obtained received data signal, and outputs the obtained signaling of a higher-level layer to the PDCCH design receiving unit 39.

The PDCCH design receiving unit 39 receives design information contained in the signaling of a higher-level layer decoded by the error correction decoding unit 38 and outputs the design information to the signal separating unit 36.

The DCI receiving unit 40 performs decoding on the DCI which is output from the signal separating unit 36 and detects (receives) the DCI. The DCI receiving unit 40 outputs DL resource allocation information indicated by the received DCI to the signal separating unit 36. Moreover, the DCI receiving unit 40 outputs UL resource allocation information indicated by the received DCI to the signal allocating unit 33.

The group common PDCCH receiving unit 41 receives the group common PDCCH which is output from the signal separating unit 36.

Figure 6:
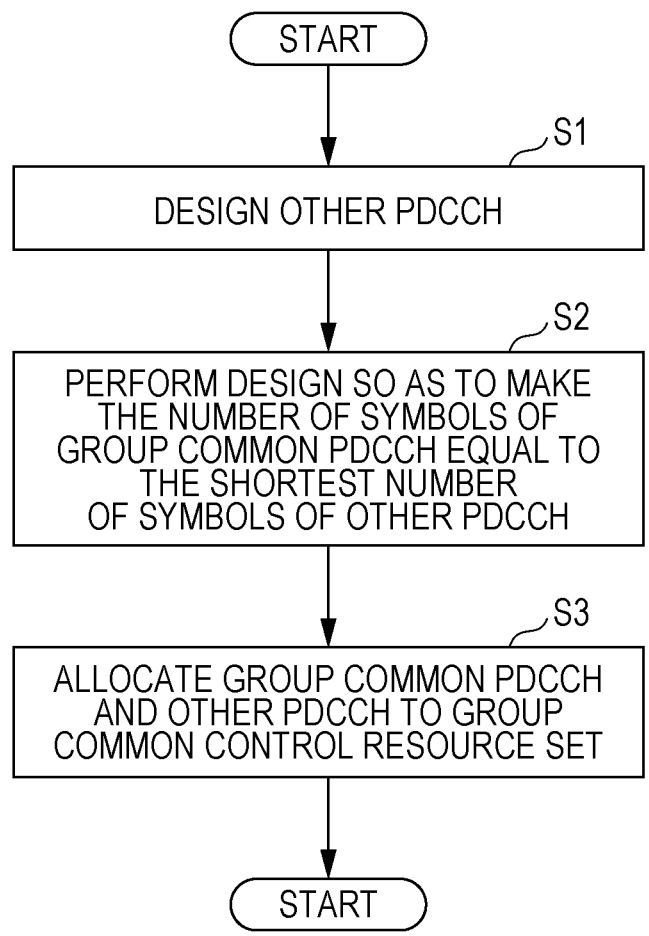
FIG. 6 shows a PDCCH design operation example of the base station.

FIG. 6 is a flowchart showing a PDCCH design operation example of the base station 100. The PDCCH design determining unit 19 designs the other PDCCH which is allocated to the group common control resource set (Step S1). For example, the PDCCH design determining unit 19 determines the number of symbols of the other PDCCH which is allocated to the group common control resource set.

Next, the PDCCH design determining unit 19 performs design so as to make the number of symbols to which the group common PDCCH is allocated equal to the shortest number of symbols to which the other PDCCH is allocated (Step S2).

Next, the signal allocating unit 13 allocates the other PDCCH and the group common PDCCH to the group common control resource set in accordance with the design performed in Steps S1 and S2 (Step S3).

Hereinafter, the placement of a PDCCH in the group common control resource set will be described. The other PDCCH and the group common PDCCH will be sometimes described simply as a PDCCH when there is no need to differentiate between the other PDCCH and the group common PDCCH.

Figure 7A:
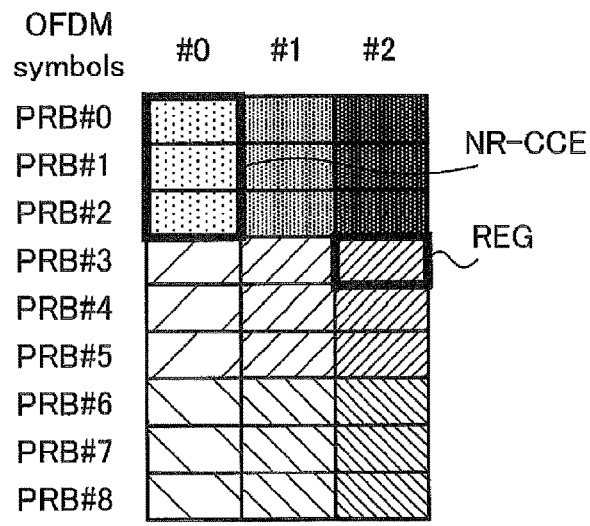
FIG. 7A explains the relationship between a PDCCH and a CCE.
Figure 7B:
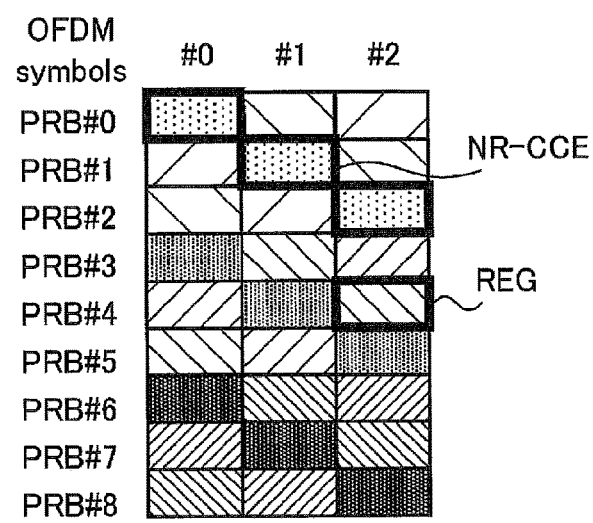
FIG. 7B explains the relationship between the PDCCH and the CCE.
Figure 7C:
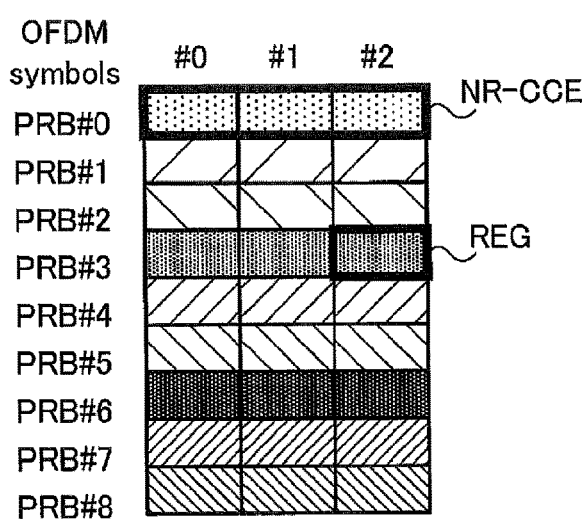
FIG. 7C explains the relationship between the PDCCH and the CCE.

FIGS. 7A, 7B, and 7C are diagrams explaining the relationship between a PDCCH and a CCE. In FIG. 7A, a REG and a CCE are depicted.

The PDCCH is configured with one or more CCEs. One CCE is configured with a plurality of REGs. The REG is configured with one symbol of one PRB (physical resource block).

The design of one CCE is broadly divided into two designs, one of which is a design in which one CCE is configured with the same symbol and the other is a design in which one CCE is configured with a plurality of symbols.

For instance, as depicted in FIG. 7A, one CCE can be configured with the same symbol. Moreover, as depicted in FIGS. 7B and 7C, one CCE can be configured with a plurality of symbols. It is to be noted that, in FIGS. 7A, 7B, and 7C, one CCE is configured with REGs with the same hatching, for example.

When one CCE is configured with a plurality of symbols, as depicted in FIGS. 7B and 7C, the design is divided into two designs; for example, a case where one CCE is configured with different PRBs and a case where one CCE is configured with the same PRB.

For example, as depicted in FIG. 7B, one CCE can be configured with a plurality of different symbols in different PRBs. Moreover, as depicted in FIG. 7C, one CCE can be configured with a plurality of different symbols in the same PRB.

The design that places one CCE in the same symbol as depicted in FIG. 7A can increase the number of radio resources of, for example, a PDSCH which is placed after the PDCCH. On the other hand, the design that places one CCE in a plurality of symbols as depicted in FIGS. 7B and 7C can improve the transmitting power when there is a limit to transmission power which can be used for each symbol, for example.

The base station 100 decides on which design of the types of FIGS. 7A, 7B, and 7C to use. The base station 100 provides notification of the design of the CCE to the terminal 200 by, for example, signaling (a SIB or dedicated RRC) of a higher-level layer.

When the design of one CCE includes a plurality of symbols as depicted in FIGS. 7B and 7C, the PDCCH is placed in a plurality of symbols (three symbols) irrespective of the aggregation level.

On the other hand, when one CCE is configured with the same symbol, if the aggregation level is 2 or higher, the PDCCH is configured with the same symbol (one symbol) in some cases and configured with a plurality of symbols (two or three symbols) in other cases.

Figure 8A:
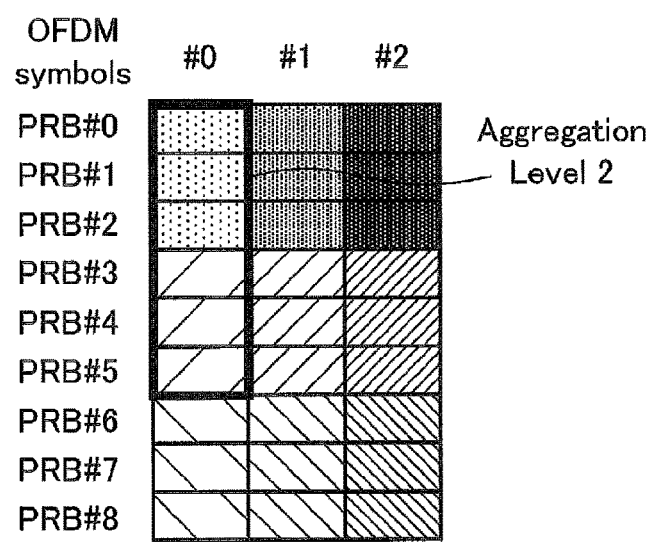
FIG. 8A explains a configuration example of the PDCCH when an aggregation level is "2".
Figure 8B:
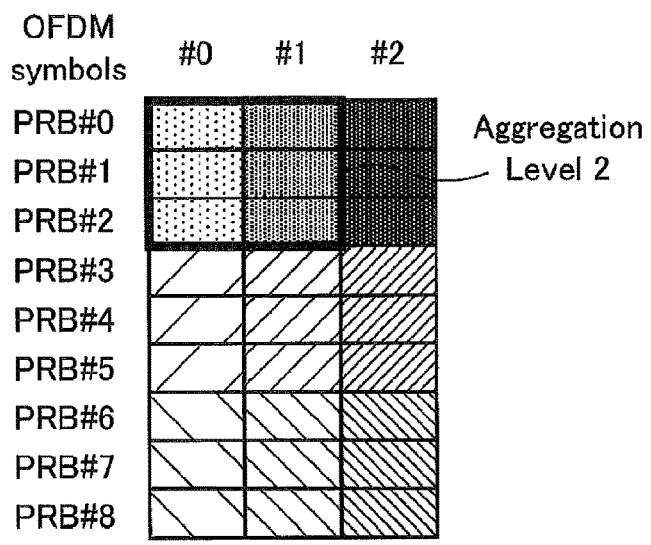
FIG. 8B explains a configuration example of the PDCCH when the aggregation level is "2".
Figure 8C:
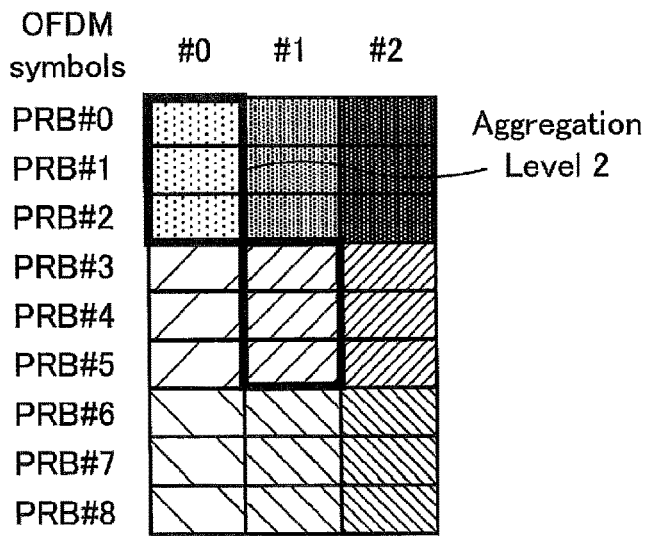
FIG. 8C explains a configuration example of the PDCCH when the aggregation level is "2".

FIGS. 8A, 8B, and 8C are diagrams explaining configuration examples of the PDCCH when the aggregation level is "2".

When one CCE is configured with the same symbol, the CCE of the PDCCH with the aggregation level "2" is sometimes configured with the same symbol as depicted in FIG. 8A. In this case, the PDCCH is placed in one symbol as depicted in FIG. 8A.

Moreover, when one CCE is configured with the same symbol, the CCE of the PDCCH with the aggregation level "2" is sometimes configured with different symbols as depicted in FIGS. 8B and 8C. That is, the CCE of the PDCCH with the aggregation level "2" or higher is sometimes configured with two or more symbols.

When the CCE of the PDCCH with the aggregation level "2" is configured with different symbols, the configuration of the CCE is broadly divided into two configurations. For instance, the configuration is divided into a case where, as depicted in FIG. 8B, the CCE of the PDCCH is configured with the same PRB and a case where, as depicted in FIG. 8C, the CCE of the PDCCH is configured with different PRBs.

That is, when the aggregation level is "2" or higher, the base station 100 can place the PDCCH in the group common control resource set based on the following three criteria.

(1) The CCE with which the PDCCH is configured is placed in the same symbol as depicted in FIG. 8A, for example (Frequency first mapping).

(2) The CCE with which the PDCCH is configured is placed in a plurality of different symbols in the same PRB as depicted in FIG. 8B, for example (Time first mapping).

(3) The CCE with which the PDCCH is configured is placed in a plurality of different symbols in different PRBs as depicted in FIG. 8C, for example.

When the PDCCH is placed in the group common control resource set based on the above-described criterion (1), the base station 100 can reduce the number of symbols which are occupied by the PDCCH.

When the PDCCH is placed in the group common control resource set based on the above-described criterion (2), the base station 100 can reduce the amount of DMRS (demodulation reference signal), for example. Moreover, when there is a limit to transmission power which can be used for each symbol, the base station 100 can improve the transmitting power.

When the PDCCH is placed in the group common control resource set based on the above-described criterion (3), the terminal 200 can get diversity gain in both frequency and time directions.

The base station 100 (the PDCCH design determining unit 19) designs the number of symbols to which the group common PDCCH is allocated based on the number of symbols to which the other PDCCH is allocated, which is monitored (searched for) by the terminal 200. For instance, the base station 100 places (designs) the group common PDCCH so as to make the number of symbols to which the group common PDCCH is allocated equal to the shortest number of symbols to which the other PDCCH is allocated. In so doing, the base station 100 starts placement of the group common PDCCH from a first symbol of the group common control resource set.

Therefore, when performing design so as to place the other PDCCH in the same symbol (see FIGS. 7A and 8A), the base station 100 can place (design) the group common PDCCH in one symbol. This makes it possible for the base station 100 to increase the number of symbols of transmitted data.

Moreover, when performing design so as to place the other PDCCH in a plurality of different symbols (see FIGS. 7B, 7C, 8B, and 8C), the base station 100 places the group common PDCCH in a plurality of different symbols. This makes it possible for the base station 100 to improve the transmitting power of the group common PDCCH.

It is to be noted that the PDCCH which is monitored by the terminal 200 in the group common control resource set may be set at, for example, an aggregation level "4" or higher, not from an aggregation level "1". The reason is as follows: PDCCHs, which are transmitted in the group common control resource set, include a PDCCH which is concurrently received by a plurality of terminals 200 and a PDCCH which has information indicating information on the settings of the terminal 200, and are accordingly required to be of higher quality than a control signal, which is sent in the UE specific control resource set, indicating a data signal that can be resent.

Moreover, the group common PDCCH and the group common control resource set can be placed in a head portion of a slot. Placing them in the head has the advantage of being capable of starting reception of the group common PDCCH before the reception of a data portion.

Furthermore, the group common PDCCH and the group common control resource set can be transmitted in units of subframes or minislots, not in units of slots. The subframe represents a time interval of 1 msec, and one or more slots are placed in the subframe. The minislot is a unit shorter than the slot.

Moreover, notification of the design of the PDCCH which is placed in the group common control resource set and the number of symbols which are occupied by the aggregation level of 2 or higher is provided by signaling (a SIB or dedicated RRC) of a higher-level layer. Furthermore, the lowest aggregation level is assumed to be fixed in a system.

Hereinafter, the following cases in which the aggregation level is "2" will be described.

Case 1) A case in which the other PDCCH is placed in the same symbol as depicted in FIG. 8A

Case 2) A case in which the other PDCCH is placed in a plurality of different symbols as depicted in FIG. 8B (or FIG. 8C)

Case 3) A case in which the CCE of the other PDCCH is configured with a plurality of different symbols as depicted in FIG. 7B

Figure 9:
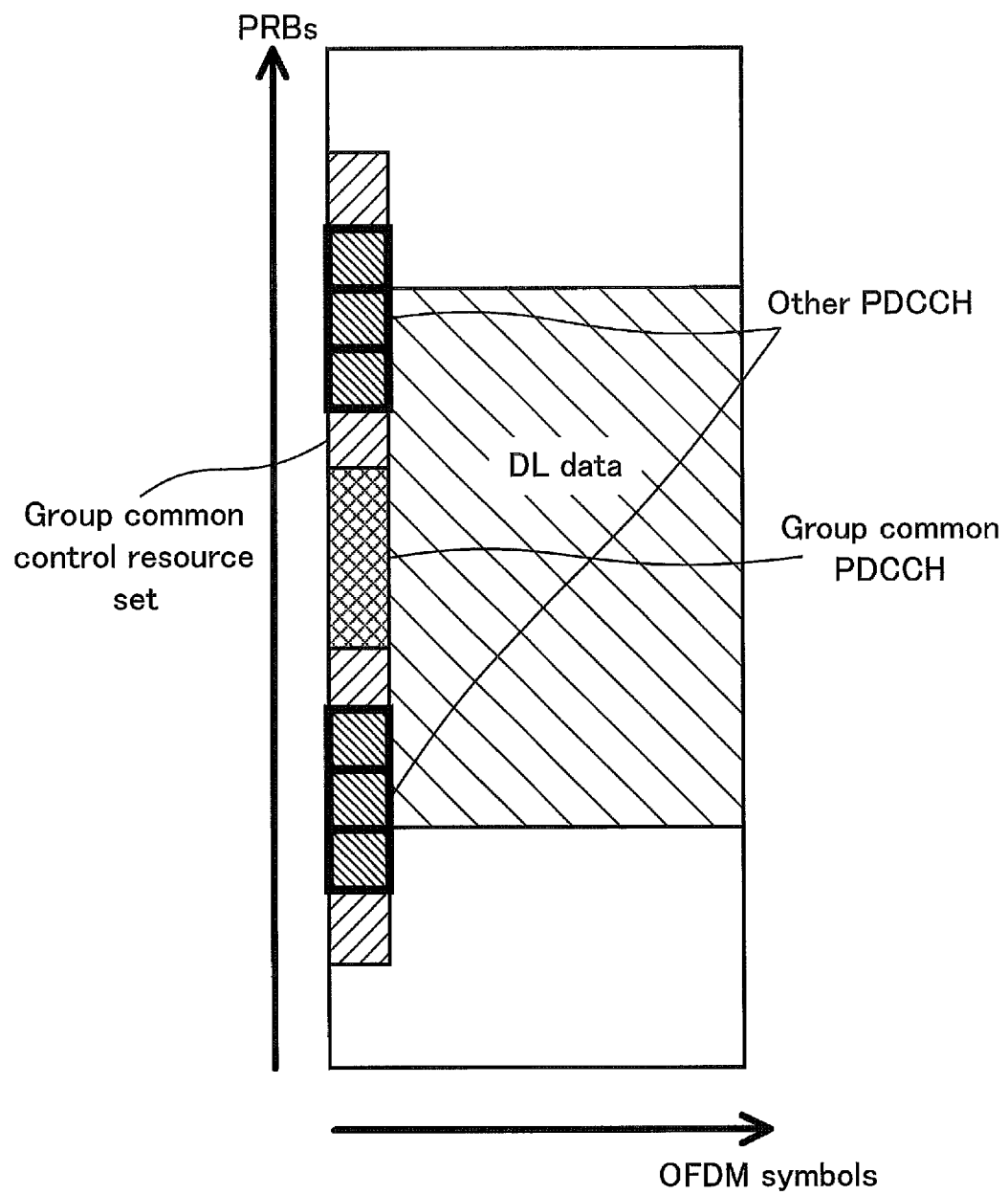
FIG. 9 explains Case 1).

FIG. 9 is a diagram explaining Case 1). In FIG. 9, the group common control resource set, the other PDCCH, and the group common PDCCH are depicted. The other PDCCH and the group common PDCCH are placed in the group common control resource set.

In the case of Case 1), the base station 100 places the other PDCCH with the aggregation level "2" in the same symbol (one symbol) as depicted in FIG. 9. Then, the base station 100 places the group common PDCCH in one symbol as depicted in FIG. 9 in the group common control resource set in accordance with the smallest number of symbols to which the other PDCCH is allocated.

In the case of Case 1), the base station 100 can perform design so that the number of symbols to which the other PDCCH is allocated and the number of symbols to which the group common PDCCH is allocated are "1". In this case, the base station 100 can start allocation of transmitted data from a symbol "#1".

Figure 10:
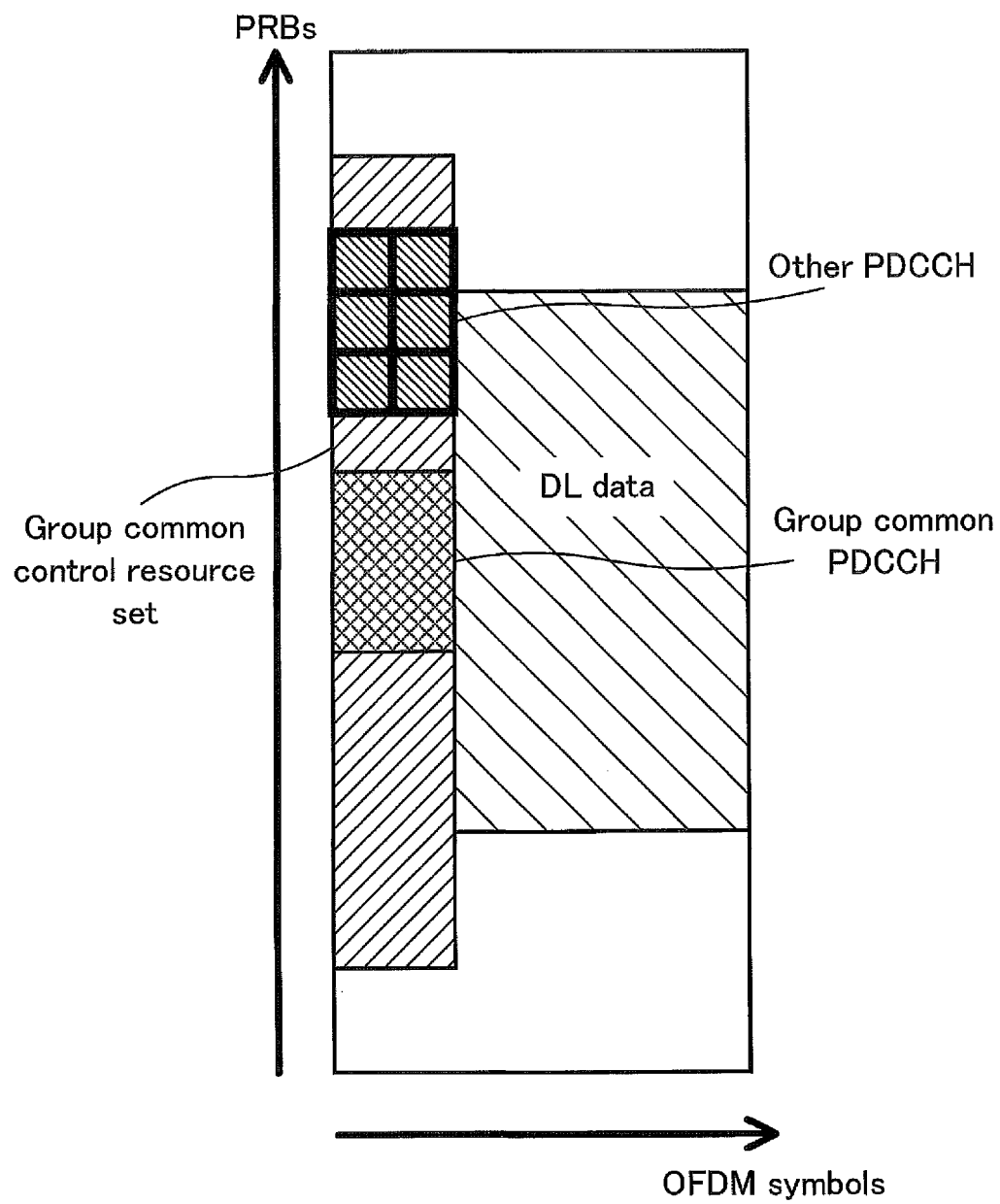
FIG. 10 explains Case 2).

FIG. 10 is a diagram explaining Case 2). In the case of Case 2), the base station 100 places two CCEs of the other PDCCH with the aggregation level "2" in a plurality of different symbols (two symbols) as depicted in FIG. 10. Then, the base station 100 places the group common PDCCH in two symbols as depicted in FIG. 10 in the group common control resource set in accordance with the smallest number of symbols to which the other PDCCH is allocated.

In the case of Case 2), the base station 100 can limit the symbols which are occupied by both the other PDCCH and the group common PDCCH to symbols "#0, #1". In this case, the base station 100 can start allocation of transmitted data from a symbol "#2".

Figure 11:
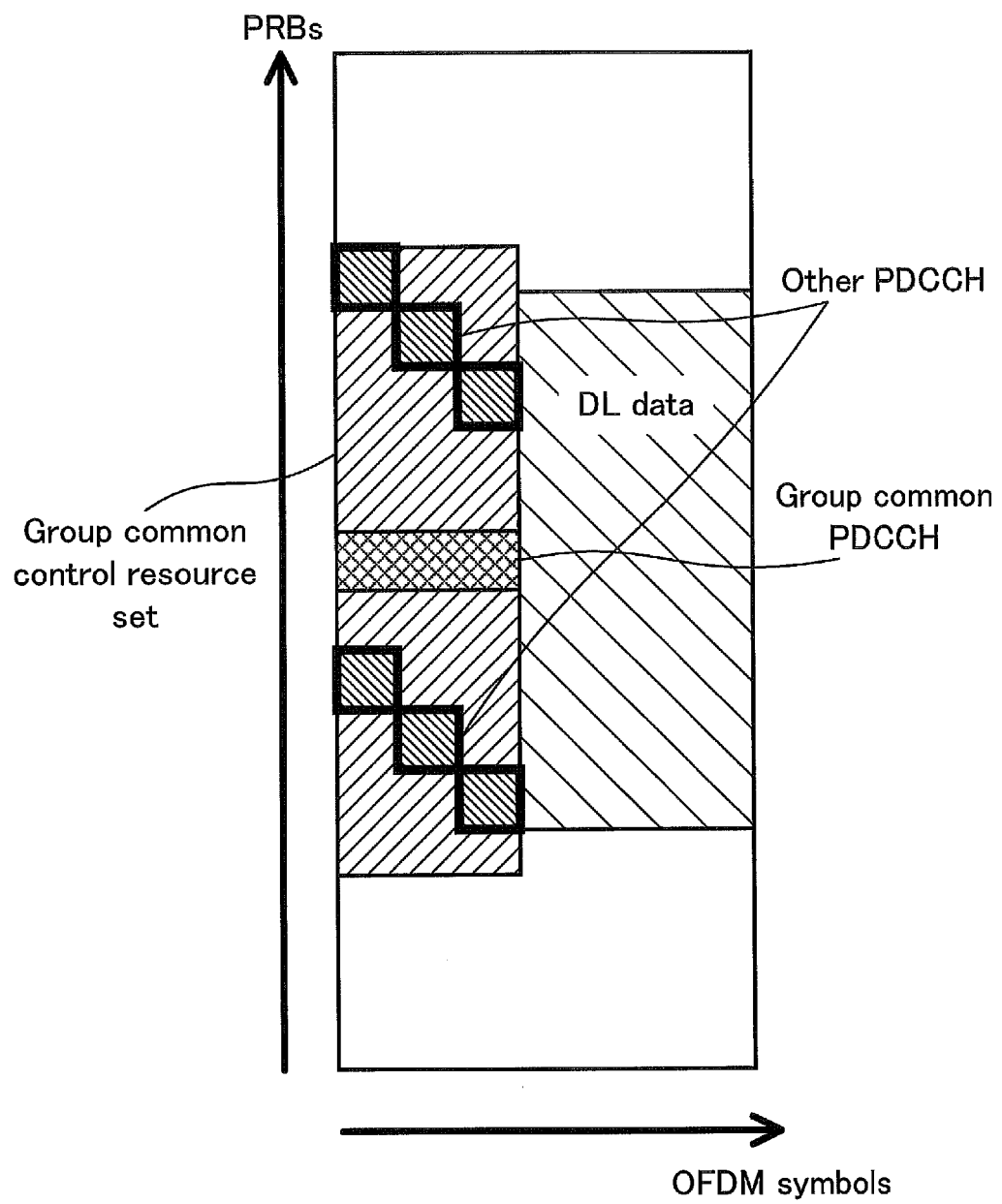
FIG. 11 explains Case 3).

FIG. 11 is a diagram explaining Case 3). In the case of Case 3), the base station 100 places the CCEs with which the other PDCCH is configured in a plurality of different symbols (three symbols) as depicted in FIG. 11. In the case of Case 3), the other PDCCH is placed in all of the symbols which are allocated to the group common control resource set. Therefore, the group common PDCCH is also designed so as to occupy all the symbols of the group common control resource set.

In the case of Case 3), since the other PDCCH is placed in all of the three symbols irrespective of the aggregation level, the group common PDCCH is also placed in three symbols.

As described above, the base station 100 (the PDCCH design determining unit 19) designs the number of symbols of the group common PDCCH which is allocated to the group common control resource set, which is monitored by the terminal 200 belonging to a group, so as to make it equal to the smallest number of symbols of the other PDCCH which is allocated to the group common control resource set. This makes it possible for the base station 100 to appropriately place the group common PDCCH, which notifies the terminal of the configuration of a slot, in radio resources. For example, the base station 100 can increase the number of symbols that can transmit and receive data.

Moreover, the base station 100 can avoid a situation in which the number of symbols to which the group common PDCCH is allocated becomes larger than the number of symbols to which the other PDCCH is allocated and a starting point (a starting symbol) of transmitted data is delayed by an area which is occupied by the group common PDCCH.

Furthermore, when the other PDCCH, which is placed in the group common control resource set, is placed in a plurality of symbols, a user of poor line quality may exist in that group. In such a case, since the group common PDCCH is also placed in a plurality of symbols, there is an advantage of making it possible for even the user of poor line quality to improve the reception quality of the group common PDCCH.

In addition, the number of symbols to which the group common PDCCH is allocated is determined from the design of the PDCCH which is placed in the group common control resource set; however, the number of symbols to which the group common PDCCH is allocated is sometimes not equal to the number of symbols of the group common control resource set. The group common control resource set is an area in which the terminal 200 monitors a plurality of PDCCHs, and, when the number of PDCCHs which are placed therein is increased, the area which is actually used becomes larger. When the number of PDCCHs which are placed therein is small and the aggregation level is low, the area which is actually used can be made smaller. In that case, the number of symbols which are actually used is smaller than the number of symbols which are allocated as the group common control resource set. The number of symbols to which the group common PDCCH is allocated is set at the smallest number of symbols to be used on the assumption that a small number of PDCCHs is allocated.

Second Embodiment

The group common control resource set may not be placed in each slot. In a second embodiment, the design of the group common PDCCH when the group common control resource set is not placed in each slot will be described.

Figure 12:
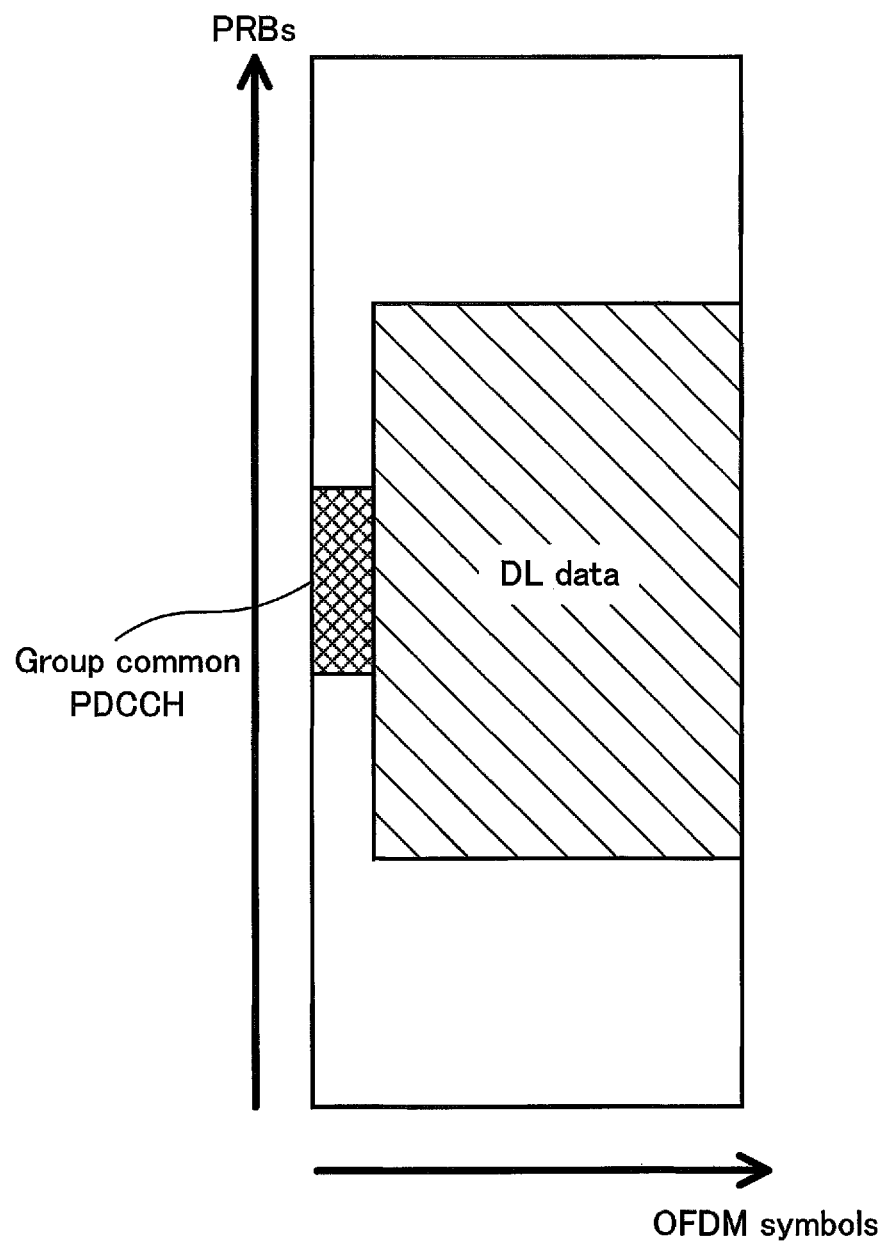
FIG. 12 explains a design example of the group common PDCCH according to a second embodiment.

FIG. 12 is a diagram explaining a design example of the group common PDCCH according to the second embodiment. In a slot depicted in FIG. 12, the group common control resource set is not placed.

As described in the First Embodiment, in the slot in which the group common control resource set is placed, the number of symbols to which the group common PDCCH is allocated is made equal to the smallest number of symbols to which the other PDCCH, which is monitored by the terminal 200, is allocated. On the other hand, as depicted in FIG. 12, in the slot in which the group common control resource set is not placed, the number of symbols to which the group common PDCCH is allocated is set at "1".

Notification of the slot in which the terminal 200 monitors the group common control resource set is assumed to be provided in advance by signaling (a SIB or dedicated RRC) of a higher-level layer.

The frequency of a PDCCH to be transmitted in the group common control resource set may not have to be set for each slot. In particular, in a slot to which UL data is allocated, it is not necessary to place a PDCCH in the group common control resource set because DL data such as a SIB cannot be transmitted on a data area.

Thus, by making settings in advance so that the group common control resource set is not monitored in a slot in which UL data is to be allocated, it is possible to reduce unnecessary monitoring of a PDCCH. However, settings can be made so that the group common PDCCH is received by the terminal 200 because there is a need to provide notification of the number of symbols of a UL data area, other control information, or the like.

In the slot in which the group common control resource set is not placed, the base station 100 (the PDCCH design determining unit 19) sets the number of symbols of the group common PDCCH at "1" as depicted in FIG. 12. As a result, the group common PDCCH is not expected to produce the effect of power boosting. However, since there is not the other PDCCH which would be placed in the group common control resource set, the power, which would be used for the other PDCCH, can be used for the group common PDCCH and sufficient power can be secured.

As described above, in the slot in which the group common control resource set is not placed, the base station 100 performs design so that the group common PDCCH is allocated to one symbol. This makes it possible for the base station 100 to appropriately place the group common PDCCH in radio resources. For instance, in the slot in which the group common control resource set is not placed, the base station 100 can reduce the number of symbols in which the group common PDCCH is placed and increase the number of symbols which are allocated to data.

Third Embodiment

In a third embodiment, the group common PDCCH is monitored at a plurality of aggregation levels and the number of symbols which are occupied is made variable for each aggregation level. The base station 100 improves the line quality by increasing the number of symbols which are occupied by the group common PDCCH when the aggregation level is high.

When the group common PDCCH is monitored at a plurality of aggregation levels, the base station 100 can select the aggregation level in accordance with the line quality. For example, the base station 100 lowers the aggregation level for the terminal 200 of a group of good line quality. This makes it possible for the base station 100 to reduce the amount of resources which is used for the group common PDCCH. Moreover, the base station 100 raises the aggregation level for the terminal 200 of a group of poor line quality. This makes it possible for the base station 100 to transmit the group common PDCCH at a low code rate with increased error resilience.

The aggregation level which is set for the group common PDCCH may be different from the aggregation level of the other PDCCH which is monitored in the group common control resource set.

When the aggregation level of the group common PDCCH is lower than X, the base station 100 makes the number of symbols to which the group common PDCCH is allocated equal to the smallest number of symbols to which the other PDCCH, which is monitored by the UE in the group common control resource set, is allocated. Moreover, when the aggregation level of the group common PDCCH is higher than or equal to X, the base station 100 makes the number of symbols to which the group common PDCCH is allocated equal to the second smallest number of symbols to which the other PDCCH is allocated.

Figures 13, 14:
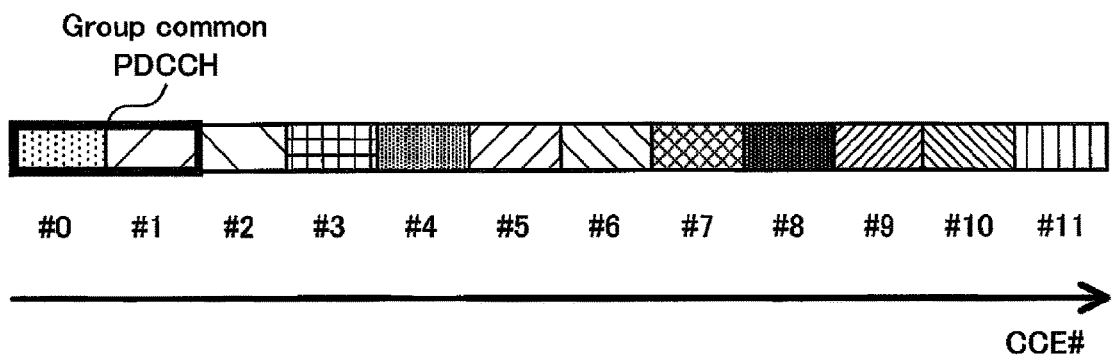
FIG. 13 explains an example of the number of symbols which are allocated to the group common PDCCH according to a third embodiment.
FIG. 14 depicts an example of logical mapping of CCEs according to a fourth embodiment.

FIG. 13 is a diagram explaining an example of the number of symbols which are allocated to the group common PDCCH according to the third embodiment.

Assume that the aggregation levels of the other PDCCH, which is monitored by the terminal 200 in the group common control resource set, are "4" and "8". Assume that a design in which, as depicted in FIG. 13, the other PDCCH is placed in one symbol when the aggregation level is "4" and the other PDCCH is placed in two symbols when the aggregation level is "8" is adopted.

Moreover, assume that the aggregation levels of the group common PDCCH are "1" and "2" and "X=2".

In this case, as depicted in FIG. 13, the base station 100 (the PDCCH design determining unit 19) performs design so as to make the number of symbols to which the group common PDCCH, whose aggregation level is lower than "X=2" (that is, the aggregation level "1"), is allocated equal to the smallest number of symbols "1" to which the other PDCCH is allocated. Moreover, as depicted in FIG. 13, the base station 100 performs design so as to make the number of symbols to which the group common PDCCH, whose aggregation level is higher than or equal to "X=2" (that is, the aggregation level "2"), is allocated equal to the second smallest number of symbols "2" to which the other PDCCH is allocated.

By doing so, the base station 100 can increase the number of symbols of the group common PDCCH which is placed in the group common control resource set with a rise in the aggregation level of the group common PDCCH. That is, the base station 100 can increase the number of symbols to which the group common PDCCH is allocated in accordance with the magnitude of an aggregation level.

As described above, the base station 100 makes the number of symbols of the group common PDCCH variable in accordance with the aggregation level. This makes it possible for the base station 100 to appropriately place the group common PDCCH in radio resources. For example, by selecting a high aggregation level, the base station 100 can increase the number of symbols to which the group common PDCCH is allocated and thereby improve the line quality.

In the above description, it is assumed that the aggregation level of the group common PDCCH is lower than that of a PDCCH which is placed in the group common control resource set. This is because the information bit number contained in the group common PDCCH is assumed to be smaller than that of the other PDCCH. A necessary aggregation level differs depending on the amount of information bit number.

Moreover, a fixed value may be set irrespective of the design of the other PDCCH which is placed in the group common control resource set, such that the number of symbols to which the group common PDCCH is allocated is set at "1" when the aggregation level of the group common PDCCH is lower than X and the number of symbols to which the group common PDCCH is allocated is set at "2" when the aggregation level of the group common PDCCH is higher than or equal to X.

Furthermore, when the base station 100 selects the group common PDCCH with a high aggregation level, it is assumed that a user of poor line quality is included in a group. Moreover, in such a case, it is assumed that a slot, a minislot, or a subframe is strongly interfered with.

In such a case, the base station 100 probably uses the other PDCCH with a high aggregation level, which is monitored by the terminal 200 in the group common control resource set, in order to increase error resilience. Therefore, by transmitting the group common PDCCH in the number of symbols which is equal to that of the other PDCCH which is placed in the group common control resource set, power boosting of the group common PDCCH is made possible. Since the number of symbols of the other PDCCH which is placed in the group common control resource set and the number of symbols to which the group common PDCCH is allocated are equal to each other, transmitted data of the terminal 200, for example, can start after the symbols of the other PDCCH and the group common PDCCH which are placed in the group common control resource set.

Fourth Embodiment

In a fourth embodiment, a CCE # is allocated in order of symbol number, starting with the lowest one, so that the group common PDCCH can be placed in a first symbol. Moreover, when REGs of a CCE # are mapped to a plurality of symbols, the group common PDCCH is also placed in a plurality of symbols so as to make power boosting possible.

FIG. 14 is a diagram depicting an example of logical mapping of CCEs according to the fourth embodiment. When the aggregation level of the group common PDCCH is set at "n", the base station 100 (the PDCCH design determining unit 19) allocates the group common PDCCH to CCE #0 to CCE #n−1. For instance, when the aggregation level of the group common PDCCH is set at "2", the base station 100 allocates the group common PDCCH to CCE #0 and CCE #1.

Figure 15A:
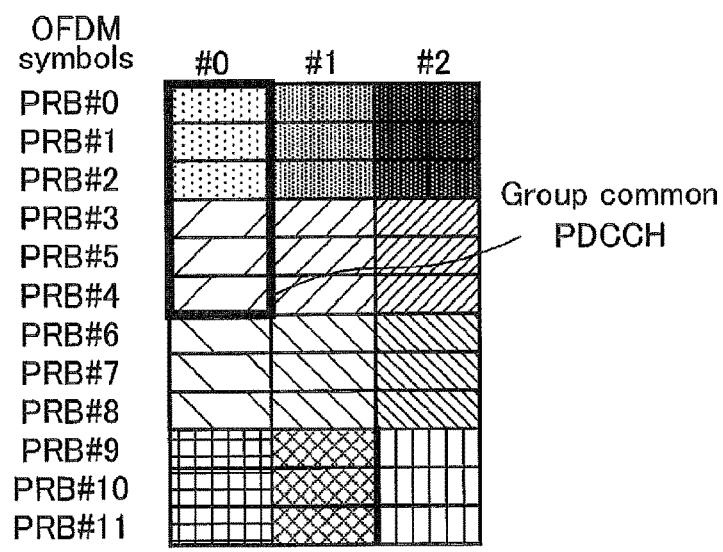
FIG. 15A explains radio resources.
Figure 15B:
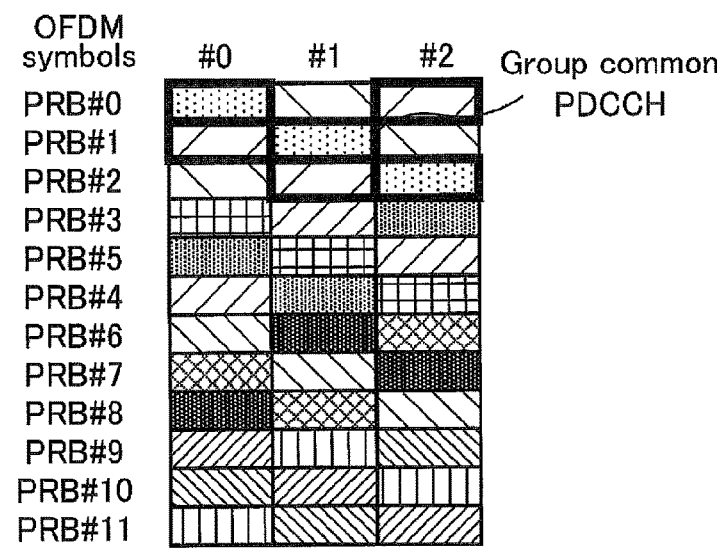
FIG. 15B explains the radio resources.
Figure 15C:
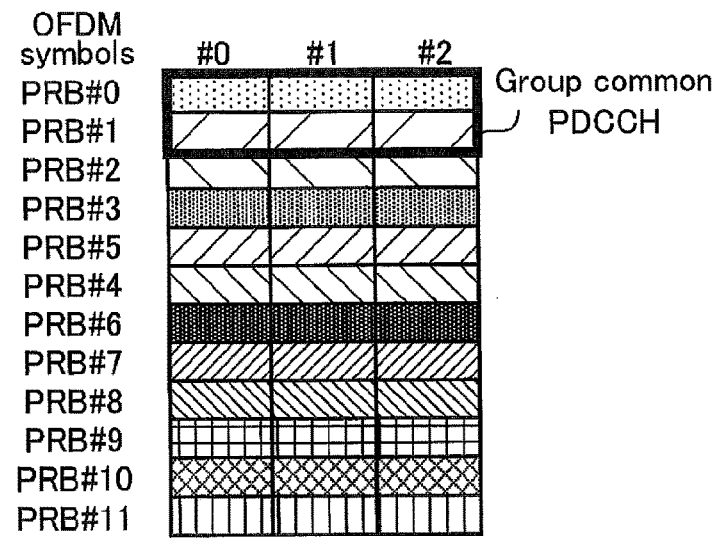
FIG. 15C explains the radio resources.

FIGS. 15A, 15B, and 15C are diagrams explaining radio resources. Hatching depicted in FIG. 14 corresponds to hatching depicted in FIGS. 15A, 15B, and 15C. For example, as depicted in FIG. 14, the group common PDCCH allocated to CCEs #0 and #1 are allocated to CCEs (REGs enclosed by a heavy line) with corresponding hatching of FIGS. 15A, 15B, and 15C.

In FIG. 15A, a CCE is configured with REGs of the same symbol. When allocation of a CCE # depicted in FIG. 14 starts from the head of the symbol of FIG. 15A, placement of the group common PDCCH starts from a first symbol in the group common control resource set.

For instance, when the group common PDCCH is placed in CCEs #0 and #1 depicted in FIG. 14, placement of the group common PDCCH starts from a first symbol in the group common control resource set as depicted in FIG. 15A. That is, by starting allocation of the group common PDCCH from the head of the CCE # of FIG. 14, the base station 100 (the PDCCH design determining unit 19) can place the group common PDCCH in a symbol #0 and use a symbol #1 and subsequent symbols for transmitted data.

In FIGS. 15B and 15C, a CCE is configured with REGs of different symbols. No matter to which CCE # depicted in FIG. 14 the group common PDCCH is allocated, the group common PDCCH is placed in a plurality of symbols (three symbols) as depicted in FIGS. 15B and 15C. By adopting the correspondence relationship depicted in FIGS. 14 and 15B or the correspondence relationship depicted in FIGS. 14 and 15C, the base station 100 can apply power boosting.

In the case of FIGS. 15B and 15C, no matter to which CCE # of a logical map the group common PDCCH is allocated, the number of symbols which are used is the same. For example, as depicted in FIGS. 15B and 15C, the number of symbols which are allocated to the group common PDCCH is "3".

Deciding to "start placement of the group common PDCCH from the head of the CCE #" provides the base station 100 with the advantage of being capable of using a common way to perform allocation processing of a CCE to a logical map (see FIG. 14) in both a case where a CCE is configured with REGs of the same symbol (see FIG. 15A) and a case where a CCE is configured with REGs of a plurality of symbols (see FIGS. 15B and 15C).

When the aggregation level of the group common PDCCH is uniquely determined, the terminal 200 can monitor the other PDCCH, recognizing that the other PDCCH is placed in CCEs other than the CCEs in which the group common PDCCH is placed.

When the aggregation level of the group common PDCCH is not uniquely determined, there are two methods. As one method, there is a method by which, since the aggregation level of the group common PDCCH becomes clear after the reception of the group common PDCCH, the terminal 200 monitors the other PDCCH, excluding the CCEs occupied by the group common PDCCH. As the other method, there is a method by which the terminal 200 monitors the other PDCCH, excluding only the CCEs which are occupied by the lowest aggregation level of the group common PDCCH, without waiting until the reception of the group common PDCCH is completed.

As described above, the base station 100 starts allocation of the group common PDCCH from the head of a logical map of CCEs. This makes it possible for the base station 100 to appropriately place the group common PDCCH in radio resources. For instance, by allocating the group common PDCCH to a CCE # in order of number thereof with the lowest one first, the base station 100 can place the group common PDCCH in a first symbol of the group common control resource set. Moreover, when REGs corresponding to a CCE # are placed in a plurality of symbols (FIG. 15B or 15C), the group common PDCCH is also placed in a plurality of symbols, which allows the base station 100 to perform power boosting.

This is the end of the description of the embodiments of the present disclosure.

Although notification of the design of the group common PDCCH and the number of symbols which are occupied by an aggregation level of 2 or higher is assumed to be provided by signaling (a SIB or dedicated RRC) of a higher-level layer and the lowest aggregation level is assumed to be fixed in a system, the design of the group common PDCCH and the number of symbols which are occupied by an aggregation level of 2 or higher may be determined from other information. The other information includes a transmission bandwidth, a carrier frequency, a UE capability, and so forth. It can be considered that the number of symbols which are used becomes short when a bandwidth is wide and the number of symbols which are used becomes large when a bandwidth is wide. Moreover, in a high carrier-frequency region, in particular, in a millimeter waveband, since transmission may be performed by using different beams for different symbols, the number of symbols of the group common control resource can be set at "1". As for the UE capability, different capabilities may support different designs. In particular, with a terminal for MTC (machine type communication) and a terminal for NB-lot (Narrow band IoT), it is also possible to repeatedly transmit the group common PDCCH in a plurality of symbols.

Furthermore, data is assumed to be placed in symbols after the symbols of the group common PDCCH and the other PDCCH which is placed in the group common control resource set; however, this is applied only to the area in the same PRB and, in the case of a PRB in which a PDCCH is not placed, data may start from a different symbol. Moreover, when spatial multiplexing such as SU-MIMO or CoMP is used, if spatial multiplexing of the other PDCCH or the group common PDCCH and data is performed, data may be allocated to the same symbol.

Moreover, in the above description, explanations are given on the assumption that data is DL data (PDSCH); however, UL data and other data such as data of a sidelink, data of URLLC, or data of MTC may be allocated.

Furthermore, the design of the PDCCH which is placed in the group common control resource set may be shared in units of cells or may be shared in units of groups, or settings of the design may be made possible for each terminal 200.

In addition, the above-described frequency domain (PRB #) has been described by taking up physical mapping as an example; however, logical mapping can also be adopted. In the case of logical mapping, logical mapping is changed to physical mapping, which makes it possible to place even frequency domains continuously located in the drawing in physically separated locations and thereby obtain the frequency diversity effect.

Moreover, the group common PDCCH may be defined by a different name such as a PCFICH (physical control format indicator channel), a PSFICH (physical slot format indicator channel), or a PDCCH type0.

Furthermore, in the drawings mentioned above, a CCE is assumed to be configured with three REGs; however, the number of REGs is not limited to this example and the number of REGs with which a CCE is configured may be a different value such as 4, 6, or 8.

In addition, the group common control resource set is sometimes called a group common search space.

Moreover, the above-described group common control resource set may be replaced by the UE specific control resource set.

The present disclosure can be implemented by software, hardware, or software used in conjunction with hardware. Each functional block used in the description of the above embodiments may be partly or entirely implemented as an LSI which is an integrated circuit, and each process described in the above embodiments may be partly or entirely controlled by one LSI or a combination of LSIs. The LSI may be configured with individual chips or configured with one chip so as to include part or all of the functional blocks. The LSI may include data input and output. The LSI may be referred to as an IC, a system LSI, a super LSI, or an ultra LSI depending on a difference in the degree of integration. The technique of circuit integration is not limited to the LSI and may be implemented by a dedicated circuit, a general-purpose processor, or a special-purpose processor. In addition, an FPGA (field programmable gate array) that is programmable after the LSI is produced or a reconfigurable processor that allows the connection and settings of circuit cells in the LSI to be reconfigured may be used. The present disclosure may be implemented as digital processing or analogue processing. Furthermore, if the circuit integration technology replacing the LSI appears by the advancement of the semiconductor technology or by another derivative technology, it goes without saying that the functional blocks may be integrated by using that technology. The application of biotechnology, for example, may be possible.

The base station of the present disclosure includes: an allocating circuit that allocates, to a resource set which is monitored by a terminal belonging to a group, a first control signal which contains information indicating the configuration of a slot and a second control signal which does not contain the information; and a transmitter that transmits the first control signal and the second control signal to a terminal. The number of symbols to which the first control signal is allocated is made equal to the smallest number of symbols to which the second control signal is allocated.

In the base station of the present disclosure, in a slot in which the resource set is not placed, the number of symbols to which the first control signal is allocated is set at 1.

In the base station of the present disclosure, the number of symbols to which the first control signal is allocated is made variable in accordance with an aggregation level.

In the base station of the present disclosure, allocation of the first control signal starts from the head of a logical map of control channel elements.

In the base station of the present disclosure, placement of the first control signal starts from a first symbol of a slot.

A communication method of the present disclosure is a communication method including: allocating, to a resource set which is monitored by a terminal belonging to a group, a first control signal which contains information indicating the configuration of a slot and a second control signal which does not contain the information; and transmitting the first control signal and the second control signal to a terminal. The number of symbols to which the first control signal is allocated is made equal to the smallest number of symbols to which the second control signal is allocated.

An aspect of the present disclosure is useful in a mobile communication system.

REFERENCE SIGNS LIST

100 base station
13 signal allocating unit
19 PDCCH design determining unit
20 group common PDCCH generating unit
200 terminal
39 PDCCH design receiving unit
41 group common PDCCH receiving unit

The invention claimed is:

1. A communication apparatus, comprising:
a receiver, which, in operation, receives a group common physical downlink control channel (PDCCH); and
circuitry, which is coupled to the receiver and which, in operation, decodes the group common PDCCH;
wherein a number of symbols to which the group common PDCCH is allocated equals a number of symbols to which another PDCCH is allocated.

2. The communication apparatus according to claim 1, wherein the number of symbols to which the group common PDCCH is allocated is variable.

3. The communication apparatus according to claim 1, wherein the group common PDCCH and the another PDCCH are allocated in a control resource set.

4. The communication apparatus according to claim 3, wherein the group common PDCCH and the another PDCCH are allocated in a time direction first before a frequency direction in the control resource set.

5. The communication apparatus according to claim 1, wherein the group common PDCCH is allocated first in a slot.

6. The communication apparatus according to claim 1, wherein a higher layer signaling indicates a slot in which the group common PDCCH is allocated.

7. The communication apparatus according to claim 1, wherein a higher layer signaling indicates a control resource set in which the group common PDCCH is allocated.

8. The communication apparatus according to claim 1, wherein the group common PDCCH indicates a number of downlink symbols, a number of uplink symbols, and a number of other symbols.

9. A communication method implemented by a communication apparatus, the communication method comprising:
receiving a group common physical downlink control channel (PDCCH); and
decoding the group common PDCCH;
wherein a number of symbols to which the group common PDCCH is allocated equals a number of symbols to which another PDCCH is allocated.

10. The communication method according to claim 9, wherein the number of symbols to which the group common PDCCH is allocated is variable.

11. The communication method according to claim 9, wherein the group common PDCCH and the another PDCCH are allocated in a control resource set.

12. The communication method according to claim 11, wherein the group common PDCCH and the another PDCCH are allocated in a time direction first before a frequency direction in the control resource set.

13. The communication method according to claim 9, wherein the group common PDCCH is allocated first in a slot.

14. The communication method according to claim 9, wherein a higher layer signaling indicates a slot in which the group common PDCCH is allocated.

15. The communication method according to claim 9, wherein a higher layer signaling indicates a control resource set in which the group common PDCCH is allocated.

16. The communication method according to claim 9, wherein the group common PDCCH indicates a number of downlink symbols, a number of uplink symbols, and a number of other symbols.

* * * * *

UNITED STATES PATENT AND TRADEMARK OFFICE
CERTIFICATE OF CORRECTION

| | | |
|---|---|---|
| PATENT NO. | : 11,265,727 B2 | Page 1 of 1 |
| APPLICATION NO. | : 16/489697 | |
| DATED | : March 1, 2022 | |
| INVENTOR(S) | : Ayako Horiuchi et al. | |

It is certified that error appears in the above-identified patent and that said Letters Patent is hereby corrected as shown below:

On the Title Page

Item [73], delete "Panasonic Intellectual Proper ty Corporation of America, Torrance, CA (US)"
insert: --Panasonic Intellectual Property Corporation of America, Torrance, CA (US)--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*